United States Patent
Kluemper et al.

(10) Patent No.: US 6,848,334 B2
(45) Date of Patent: Feb. 1, 2005

(54) SAFETY STEERING COLUMN

(75) Inventors: Hans Kluemper, Hamburg (DE); Hanno Lox, Elmshorn (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/078,155

(22) Filed: Feb. 20, 2002

(65) Prior Publication Data
US 2002/0124676 A1 Sep. 12, 2002

(30) Foreign Application Priority Data
Feb. 20, 2001 (DE) .......................................... 101 07 871

(51) Int. Cl.$^7$ ............................................... B62D 1/19
(52) U.S. Cl. ........................................ 74/492; 280/777
(58) Field of Search ...................... 74/492, 490, 491; 280/777; 464/162, 183

(56) References Cited

U.S. PATENT DOCUMENTS

| | | | |
|---|---|---|---|
| 1,541,007 A | * 6/1925 | Thiemer ...................... | 464/162 |
| 3,468,182 A | * 9/1969 | Shwartzberg ................ | 74/492 |
| 3,491,614 A | * 1/1970 | Sauders et al. ............. | 74/493 |
| 3,572,751 A | * 3/1971 | Burr et al. .................. | 280/750 |
| 4,106,311 A | * 8/1978 | Euler .......................... | 464/77 |
| 4,445,708 A | * 5/1984 | Oakes et al. ................ | 280/777 |
| 4,627,306 A | * 12/1986 | Berenjian .................... | 74/492 |
| 4,949,992 A | * 8/1990 | Abramczyk ................. | 280/777 |
| 5,074,161 A | 12/1991 | Hancock ..................... | 74/492 |
| 5,115,691 A | * 5/1992 | Beauch ....................... | 74/493 |
| 5,152,627 A | 10/1992 | Arnold ........................ | 403/109 |
| 5,169,172 A | * 12/1992 | Dolla ........................... | 280/777 |
| 5,560,257 A | * 10/1996 | DeBisschop et al. ......... | 74/492 |
| 5,590,565 A | * 1/1997 | Palfenier et al. .............. | 74/493 |
| 5,664,806 A | * 9/1997 | Vortmeyer et al. .......... | 280/777 |
| 5,706,704 A | * 1/1998 | Riefe et al. .................. | 280/777 |
| 5,709,605 A | 1/1998 | Riefe et al. .................. | 464/83 |
| 6,267,528 B1 | * 7/2001 | Higashino .................... | 74/492 |

FOREIGN PATENT DOCUMENTS

| | | |
|---|---|---|
| DE | 1 755 874 | 5/1972 |
| DE | 40 17 965 | 6/1989 |
| DE | 40717965 | 12/1990 |
| DE | 195 18 130 A1 | 11/1996 |
| FR | 2 674 646 | 10/1992 |
| GB | 1113147 | 5/1968 |
| GB | 1120799 | 7/1968 |
| JP | 10-009277 | 1/1998 |

* cited by examiner

*Primary Examiner*—David A. Bucci
*Assistant Examiner*—Bradley J. Van Pelt
(74) *Attorney, Agent, or Firm*—Crowell & Moring LLP

(57) ABSTRACT

A safety steering column for a motor vehicle, with a casing tube which is arranged concentrically to a steering shaft and is fastened to the vehicle body and which, in the event of an axial impact action, can be shortened while at the same time absorbing energy. The casing tube consists of two casing-tube parts and the displacement force between the two casing-tube parts can be set. Arrange between the two casing-tube parts is a connecting element which is fastened to one of the casing-tube parts and is pressed with a predetermined force into a groove introduced into the other casing-tube part.

30 Claims, 3 Drawing Sheets

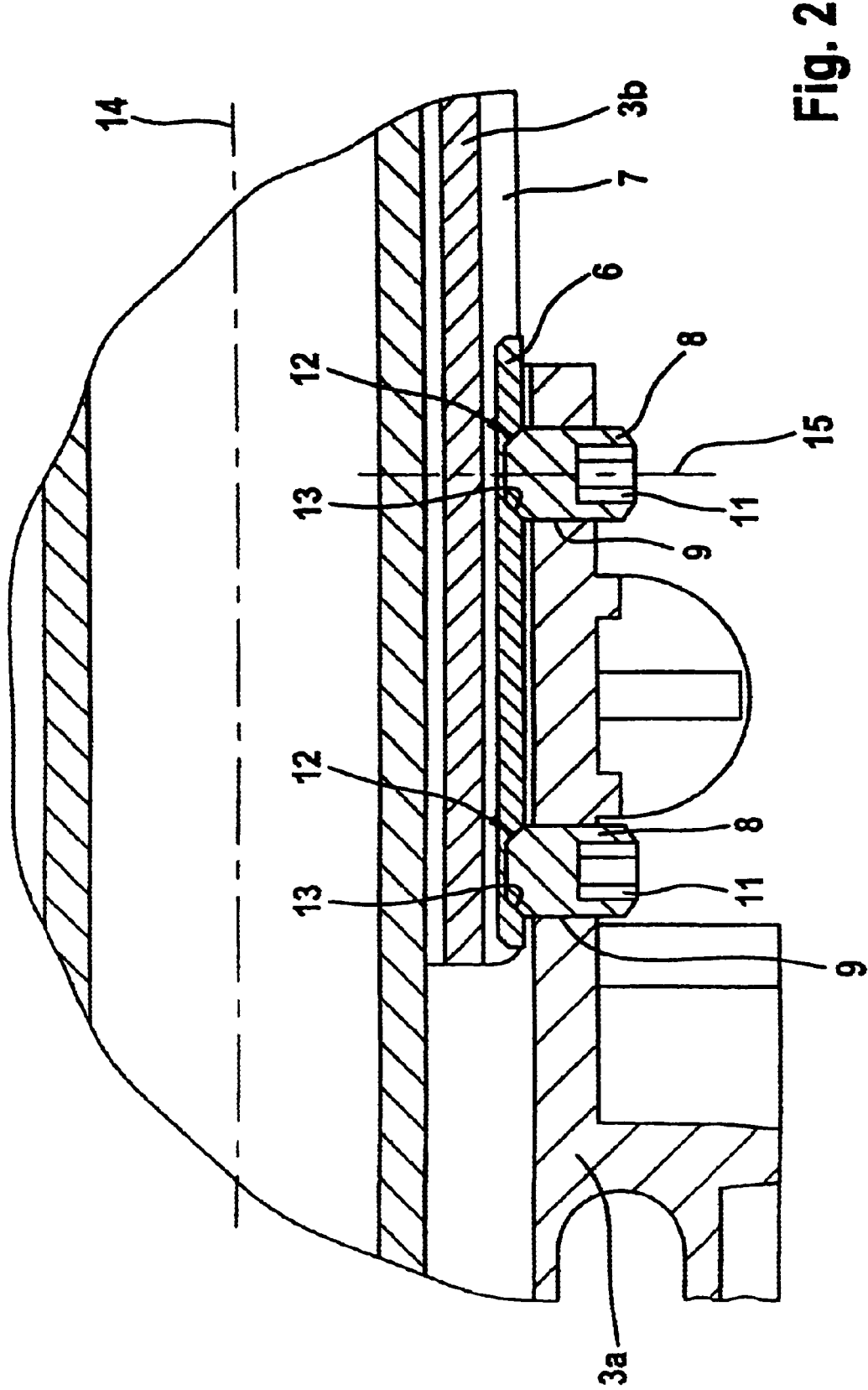

SAFETY STEERING COLUMN

BACKGROUND AND SUMMARY OF THE INVENTION

This application claims the priority of German Patent Document 101 07 871.4, filed Feb. 20, 2001, the disclosure of which is expressly incorporated by reference herein.

The invention relates to a safety steering column for a motor vehicle, with a casing tube which is arranged concentrically to a steering shaft and is fastened to the vehicle body and which, in the event of an axial impact action, can be shortened, while at the same time absorbing energy, the casing tube consisting of two casing-tube parts which have different diameters and lie partially one in the other.

Axial sliding systems for steering columns are known in a wide variety of variants. They serve for giving way in the event of an accident and an impact of the vehicle occupant against the steering wheel caused thereby and, at the same time, for absorbing impact energy. Their operating principle is based on a securing member designed for a predetermined axial load on the steering column being released when the predetermined load is exceeded, so that the components connected to one another via the securing member can be pushed one into the other, with energy being absorbed at the same time.

Thus, for example, German Patent Document DE-A-1 755 874 (Corresponding GB 1206388) discloses a safety steering column for a motor vehicle, which has a casing tube with two casing tubes lying partially one in the other. The parts of the casing tube which lie one in the other are designed conically in specific regions. A number of elastic deformation rings are arranged in the interspace of equal width which is formed by these regions and which are in the form of a cone envelope. As a result of a specific initial displacement of the two casing tubes in the direction of a shortening of the safety steering column, the elastic deformation rings are prestressed radially and the two casing tubes are prestressed axially.

This known safety steering column has the disadvantage that the displacement force between the two casing-tube parts cannot be set or cannot be adapted to this specific application, without the components themselves being modified. Moreover, the force/travel profile when the casing-tube parts are pushed together is not constant, but decreases sharply over the running travel in a way which is unfavorable for the driver. In addition, between the two casing-tube parts, there is no provision for securing against a radial displacement of the casing-tube parts relative to one another.

Against this background, an object on which the present invention is based is to provide a safety steering column for a motor vehicle, with a shortenable casing tube, in which the displacement force between the two casing-tube parts can be set.

This object is achieved, according to preferred embodiments of the invention, by a safety steering column for a motor vehicle with a casing tube which is arranged concentrically to a steering shaft and is fastened to the vehicle body and which, in the event of an axial impact action, can be shortened, while at the same time absorbing energy, the casing tube comprising two casing-tube parts which have different diameters and lie partially one in the other, wherein a connecting element is arranged between the two casing-tube parts, the connecting element being fastened to one of the casing-tube parts and being pressed with a predetermined force into a groove introduced into the other casing-tube part. Accordingly, the invention is distinguished in that the safety steering column has a casing tube which is arranged concentrically to a steering shaft and is fastened to the vehicle body and which, in the event of an axial impact action, can be shortened, while at the same time absorbing energy, the casing tube consisting of two casing-tube parts which have different diameters and lie partially one in the other. According to the invention, a connecting element is arranged between the two casing-tube parts. The connecting element is fastened to one of the casing-tube parts and is pressed with a predetermined force into a groove introduced into the other casing-tube part.

By the force with which the connecting element is pressed into the groove being varied, the displacement force between the two casing-tube parts can be set, without the components themselves being modified. When a displacement force is referred to in connection with the invention, this means the force which acts on a steering wheel and during the exceeding of which the connecting element releases the connection between the two casing-tube parts and the two parts are pushed one into the other. Since the connecting element according to the invention is pressed into the groove, displacement can take place only by a frictional force between the connecting element and the groove in the casing-tube part being overcome. This serves for absorbing impact energy.

The setting of the displacement force is advantageous particularly when the steering shaft surrounded by the casing tube is likewise configured so as to be capable of being pushed into itself and is designed in such a way that it absorbs energy at the same time. To be precise, the displacement force of the casing tube can then be set individually, during the assembly process, to the measured actual value of a crash element located in the steering shafting, so that the safety steering column is designed optimally.

In addition, the displacement force of the safety steering column according to certain preferred embodiments of the invention is constant over the travel. This means that, irrespective of how far the two parts of the casing tube are pushed one into the other, the displacement force is always the same.

A further advantage of certain preferred embodiments of the invention is to be seen in that the crash system is reversible, that is to say a casing tube, once pushed together in the event of a crash, can be drawn apart again and set via the crash element.

According to certain preferred embodiments of the invention, the groove in one of the casing-tube parts and the connecting element engaging into the groove have a conical cross-sectional surface with respect to a sectional plane which is oriented perpendicularly to a longitudinal axis through the two casing-tube parts. After the connecting element has been pressed into the groove in this arrangement, a positive connection is made and there is therefore no play in the radial direction between the two casing-tube parts. This is important, because operating elements, such as, for example, in embodiments where the lever for actuating the direction indicator, are fastened to the casing-tube part pointing into the vehicle interior. The exertion of force on this lever should not act on the system of a safety steering column in such a way that, for example, one casing-tube part is displaced relative to the other. This is avoided by the freedom from radial play by virtue of the conical embodiment.

The same applies to the axial direction. In this direction, the freedom from play is ensured, up to a limit predetermined by the displacement force, by the connecting element being pressed into the groove.

According to a further feature of preferred embodiments of the invention, the connecting element is pressed into the conical groove by means of at least one screw. This is particularly advantageous because the displacement force can thereby be set or adapted in a particularly simple way via the tightening torque of the screws. Screws can also be set by hand according to the individual requirements even during assembly.

It has proved particularly advantageous according to certain preferred embodiments of the invention if the screw has a conical end which engages into a corresponding recess in the connecting element. Such a connection likewise affords the advantages during assembly, since the screw is automatically drawn via the conical shape into the corresponding recess in the connecting element, and there is no need to align the connecting element by hand in such a way that it interacts with the screw.

In certain preferred embodiments of the invention, the groove is introduced into the outer wall of the casing-tube part which has the smaller diameter. The screw engages correspondingly with its thread into a thread in the casing-tube part which has the larger diameter. Assembly becomes particularly simple as a result, since the screw is easily accessible from outside.

In order that the displacement force can be set specifically, it is advantageous for the connecting element to be a sliding piece according to certain preferred embodiments of the invention, of which at least the surface on which the two casing-tube parts slide against one another when they are pushed together has a defined roughness, so that the frictional force between the two casing-tube parts can be determined exactly after the tightening of the screw. Advantageously, the surface of the groove, that is to say its roughness, may also be coordinated with the surface of the sliding piece. Both surfaces are preferably made plane and smooth. The displacement force can thereby by set reliably.

It is also contemplated to use, the connecting element according to the invention in the case of a steering column which is designed so as to be capable of being pushed together for a crash. In this case, however, the torsional moments additionally occurring in the case of a steering column must be taken into account in the design.

Other objects, advantages and novel features of the present invention will become apparent from the following detailed description of the invention when considered in conjunction with the accompanying drawings.

BRIEF DESCRIPTION OF THE DRAWINGS

FIG. 2 shows an enlarged illustration of a detail of a connection between two casing-tube parts of the FIG. 1 arrangement.

DETAILED DESCRIPTION OF THE DRAWINGS

Figure 1:
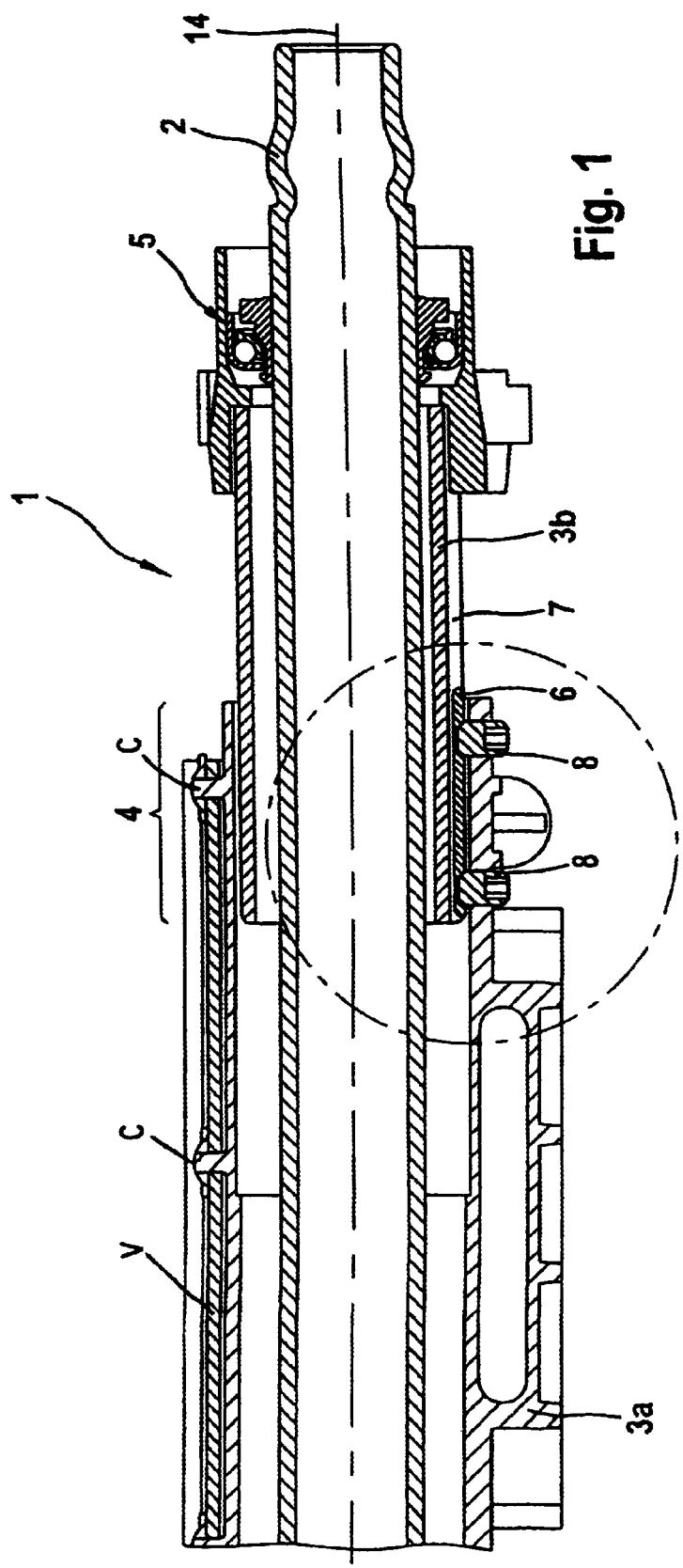
FIG. 1 shows a longitudinal section through a safety steering column constructed according to a preferred embodiment of the invention.

FIG. 1 illustrates a longitudinal section through a safety steering column 1 according to the invention. The steering column 1 has a steering shaft 2. The mechanism for the axial shortening of the steering shaft 2 is not illustrated in the drawing. This mechanism may be configured according to the solutions known from the prior art.

The steering column 1 also has a casing tube 3 which consists of a part 3a with a larger diameter and of a part 3b with a smaller diameter. The two casing-tube parts 3a and 3b lie partially one in the other in the region 4. They are connected to one another in this region. The casing-tube part 3a is fastened to the vehicle body part V via schematically depicted connections C. The casing-tube part 3b has, at its end pointing away from the casing-tube part 3a, a mounting 5 which ensures a rotation of the steering shaft 2 in the casing tube 3. The casing-tube part 3b points into the vehicle interior and serves inter alia for fastening operating elements, such as, for example, a direction indicator.

The connection of the two casing-tube parts 3a and 3b is made via a connecting element in the form of a sliding piece 6. For this purpose, a groove 7 is introduced into the outward-pointing surface of the inner casing-tube part 3b. The sliding piece 6 lies in this groove 7. The sliding piece 6 is fixed to the outer casing-tube part 3a via screws 8.

As is evident from the illustration of the detail according to FIG. 2, the screws 8 engage with a thread, not illustrated, into threaded bores 9 which are introduced into the casing-tube part 3a. The bores 9 pass through the casing-tube part 3a and the screws 8 extend completely through these bores 9. The screws 8 have, outwardly, a structure 11 for the engagement of tools for tightening the screws 8. Inwardly, that is to say facing the inner casing-tube part 3b, the screws 8 are equipped with a conical head 12. This conical head 12 of the screws 8 engages into corresponding recesses 13 in the sliding piece 6.

Figure 3A:
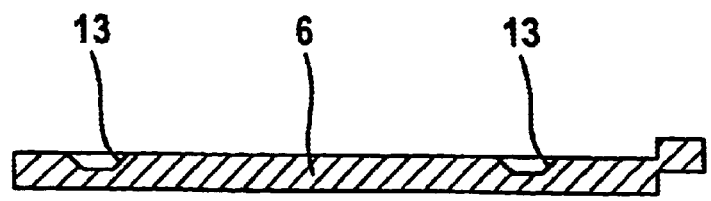
FIG. 3 shows a top view and two sectional illustrations of a connecting element between the two casing-tube parts of the embodiment of FIGS. 1 and 2.
Figure 3B:
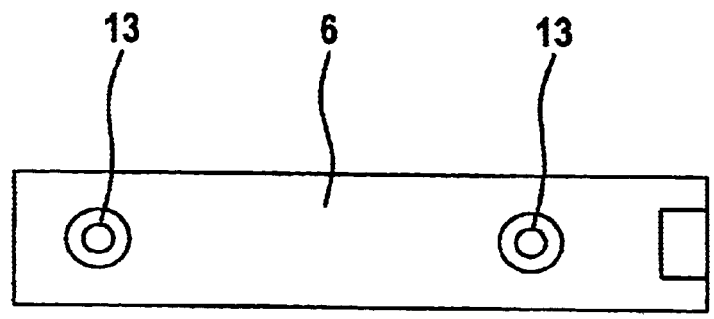
Figure 3C:
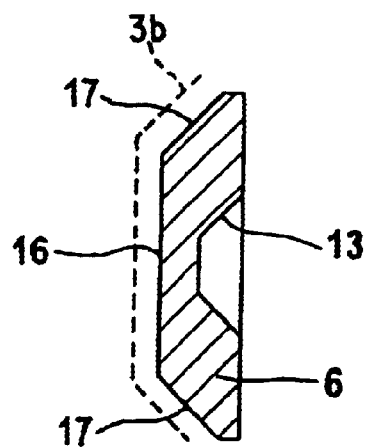

The sliding piece 6 and the groove 7 have a conical cross section, starting from a sectional plane 15 which is oriented perpendicularly to a longitudinal axis 14 of the casing tube 3. This may be gathered from FIG. 3c which illustrates such a cross section of the sliding piece 6. The conical recess 13, into which the heads 12 of the screws 8 engage, may likewise be seen in FIG. 3c. FIGS. 3a and 3b illustrate how the recesses 13 are arranged in relation to one another on the sliding piece 6.

The surface 16 of the sliding piece 6 may be configured in such a way that a predetermined roughness is set. The same applies to the conical faces 17 and the corresponding faces of the groove 7. The casing-tube parts 3a and 3b slip on one another via the faces 16 and 17 of the sliding piece 6 in the event of axial displacement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Safety steering column for a motor vehicle, with a casing tube which is arranged concentrically to a steering shaft and is fastened to a vehicle body and which, in the event of an axial impact action, can be shortened, while at the same time absorbing energy, the casing tube comprising two casing-tube parts which have different diameters and lie partially one in the other, wherein a connecting element is sandwiched between an inner wall of one of the two casing-tube parts and an outer wall of the other two casing-tube parts, the connecting element being fastened to one of the casing-tube parts and being pressed with a predetermined force into a groove introduced into the other casing-tube part, the connecting element being translatable along the groove.

2. Safety steering column for a motor vehicle, with a casing tube which is arranged concentrically to a steering shaft and is fastened to a vehicle body and which, in the event of an axial impact action, can be shortened, while at the same time absorbing energy, the casing tube comprising two casing-tube parts which have different diameters and lie partially one in the other, wherein a connecting element is arranged between the two casing-tube parts, the connecting element being fastened to one of the casing-tube parts and being pressed with a predetermined force into a groove introduced into the other casing-tube part, the connecting element being translatable alone the groove, wherein the groove and the connecting element have respective conical cross-sectional surfaces with respect to a sectional plane which is oriented perpendicularly to a longitudinal axis through the two casing-tube parts.

3. Safety steering column according to claim 1, wherein the connecting element is pressed into the groove by means of at least one screw.

4. Safety steering column according to claim 2, wherein the connecting element is pressed into the groove by means of at least one screw.

5. Safety steering column according to claim 3, wherein each of the at least one screws has a conical end which engages into a corresponding recess in the connecting element.

6. Safety steering column according to claim 4 wherein each of the at least one screws has a conical end which engages into a corresponding recess in the connecting element.

7. Safety steering column according to claim 1, wherein the groove is introduced into an outer face of the casing-tube part having the smaller diameter.

8. Safety steering column according to claim 2, wherein the groove is introduced into an outer face of the casing-tube part having the smaller diameter.

9. Safety steering column according to claim 3, wherein the groove is introduced into an outer face of the casing-tube part having the smaller diameter.

10. Safety steering column according to claim 5, wherein the groove is introduced into an outer face of the casing-tube part having the smaller diameter.

11. Safety steering column according to claim 5, wherein each of the at least one screws engages with its thread into the casing-tube part which has the larger diameter.

12. Safety steering column according to claim 6, wherein each of the at least one screws engages with its thread into the casing-tube part which has the larger diameter.

13. Safety steering column according to claim 1, wherein the connecting element is a sliding piece.

14. Safety steering column according to claim 2, wherein the connecting element is a sliding piece.

15. Safety steering column according to claim 3, wherein the connecting element is a sliding piece.

16. Safety steering column according to claim 5, wherein the connecting element is a sliding piece.

17. Safety steering column according to claim 11, wherein the connecting element is a sliding piece.

18. Safety steering column according to claim 13, wherein at least a surface of the sliding piece on which the two casing-tube parts slide relative to one another when they are pushed together has a defined roughness.

19. Safety steering column according to claim 14, wherein at least a surface of the sliding piece on which the two casing-tube parts slide relative to one another when they are pushed together has a defined roughness.

20. Safety steering column according to claim 15, wherein at least a surface of the sliding piece on which the two casing-tube parts slide relative to one another when they are pushed together has a defined roughness.

21. Safety steering column according to claim 16, wherein at least a surface of the sliding piece on which the two casing-tube parts slide relative to one another when they are pushed together has a defined roughness.

22. Safety steering column according to claim 17, wherein at least a surface of the sliding piece on which the two casing-tube parts slide relative to one another when they are pushed together has a defined roughness.

23. A safety steering column assembly comprising:
a steering shaft,
a first casing tube part surrounding the steering shaft and fixed to a vehicle body part when in an in use position on a vehicle,
a second casing tube part surrounding the steering shaft,
said first and second casing tube parts being telescopingly arranged with respect to one another along a telescoping section of their respective lengths, and
a connection assembly sandwiched between the first and second casing tube parts with one another along the telescoping section while permitting relative axial movement of the casing tube parts in response to predetermined collision forces acting axially on said casing tube parts,
said connection assembly including:
a connecting element carried by one of the casing tube parts, and means for pressing said connecting element with an adjustable force into a groove provided on the other of the casing tube parts, the connecting element being slidable along the groove.

24. A safety steerage column assembly according to claim 23, wherein the groove and the connecting element have complimentary cross-sectional shapes extending longitudinally of said casing tube parts, which shapes engage one another and are slidable with respect to one another to change the length of the combined casing tube parts in response to the collision forces.

25. A safety steering column assembly comprising:
a steering shaft,
a first casing tube part surrounding the steering shaft and fixed to a vehicle body part when in an in use position on a vehicle,
a second casing tube part surrounding the steering shaft,
said first and second casing tube parts being telescopingly arranged with respect to one another along a telescoping section of their respective lengths, and
a connection assembly connecting the first and second casing tube parts with one another along the telescoping section while permitting relative axial movement of the casing tube parts in response to predetermined collision forces acting axially on said casing tube parts,
said connection assembly including:
a connecting element carried by one of the casing tube parts, and means for pressing said connecting element with an adjustable force into a groove provided on the other of the casing tube parts, the connecting element being slidable alone the groove,
wherein the groove and the connecting element have complimentary cross-sectional shapes extending longitudinally of said casing tube parts, which shapes engage one another and are slidable with respect to one another to change the length of the combined casing tube parts in response to the collision forces, and wherein said complimentary cross-sectional shapes are conical.

26. A safety steerage column assembly according to claim 23, wherein said means for pressing include at least one screw threadably supported at one of said casing tube parts and abuttingly engaged with the connecting element to press the connecting elements.

27. A safety steering column assembly comprising:

a steering shaft, a first casing tube part surrounding the steering shaft and fixed to a vehicle body part when in an in use position on a vehicle, a second casing tube part surrounding the steering shaft, said first and second casing tube parts being telescopingly arranged with respect to one another along a telescoping section of their respective lengths, and a connection assembly connecting the first and second casing tube parts with one another along the telescoping section while permitting relative axial movement of the casing tube parts in response to predetermined collision forces acting axially on said casing tube parts, said connection assembly including:

a connecting element carried by one of the casing tube parts, and means for pressing said connecting element with an adjustable force into a groove provided on the other of the casing tube parts, the connecting element being slidable alone the groove, wherein the groove and the connecting element have complimentary cross-sectional shapes extending longitudinally of said casing tube parts, which shapes engage one another and are slidable with respect to one another to change the length of the combined casing tube parts in response to the collision forces, and wherein said means for pressing include at least one screw threadably supported at one of said casing tube parts and abuttingly engaged with the connecting element to press the connecting elements.

28. A safety steerage column assembly according to claim 25, wherein said means for pressing include at least one screw threadably supported at one of said casing tube parts and abuttingly engaged with the connecting element to press the connecting elements.

29. A safety steerage column assembly according to claim 23, wherein means are provided at one of said casing tube parts for rotatably supporting the steering shaft.

30. A safety steerage column assembly according to claim 28, wherein means are provided at one of said casing tube parts for rotatably supporting the steering shaft.

* * * * *